Oct. 7, 1958  W. McK. MARTIN  2,855,314
METHOD AND APPARATUS FOR PRESERVING PRODUCTS IN
SEALED CONTAINERS
Filed May 3, 1954  2 Sheets-Sheet 1
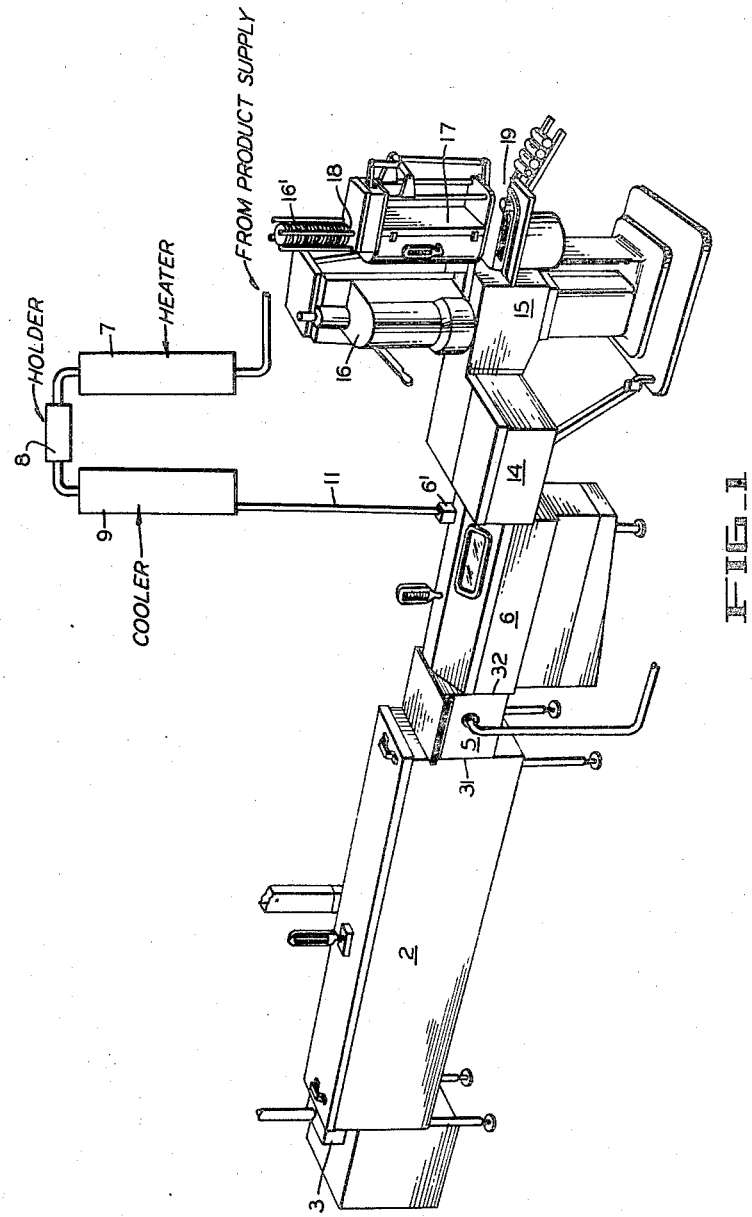
INVENTOR.
WILLIAM McK. MARTIN
BY
Fryer & Johnson
ATTORNEYS

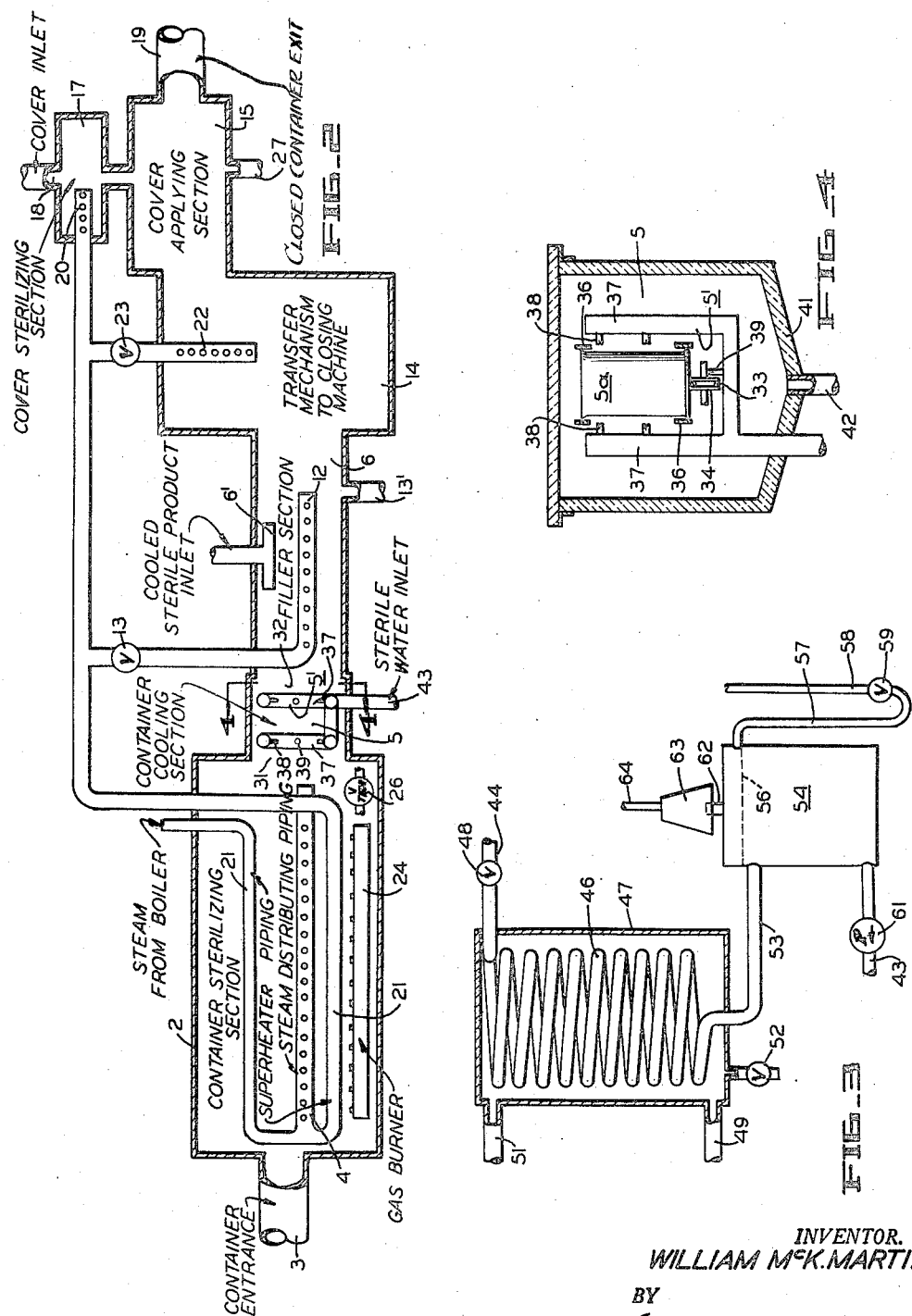

United States Patent Office 2,855,314
Patented Oct. 7, 1958

2,855,314

METHOD AND APPARATUS FOR PRESERVING PRODUCTS IN SEALED CONTAINERS

William McK. Martin, San Mateo, Calif., assignor to James Dole Engineering Co., San Francisco, Calif., a corporation of Nevada Application May 3, 1954, Serial No. 427,099

6 Claims. (Cl. 99—182)

This invention relates to the packaging and preserving of products in sealed containers, hereinafter referred to as canning, and more particularly to an improved apparatus and method for canning a sterile product, especially food product, wherein all operations of sterilization of the containers and their covers, filling the containers with the sterile product, and applying the sterile covers to the containers are conducted under sterile or aseptic conditions in a unitary self-contained apparatus embodying the principles of Patent No. 2,549,216, dated April 17, 1951.

As in the apparatus and process of such patent, the operations herein are conducted in the apparatus at substantially atmospheric pressure; sterile conditions being maintained by a highly heated or superheated gas, heated by auxiliary heating means to impart external sensible heat thereto, to maintain a suitable sterilizing temperature above 212° F. for sterilizing the covers and the containers. At the same time, the continual flow of gas into the apparatus serves as a scavenging agent to prevent inflow of outside air through all openings in the apparatus, and thereby prevent bacterial contamination in the apparatus.

Summarizing this invention, the apparatus comprises enclosure means having intercommunicating zones including a container sterilizing section provided with an entrance for containers to be filled, a product filling section having means therein for filling the containers with a pre-sterilized product, a cover sterilizing section, and a section having means therein for applying covers to the product filled containers and having an exit for the covered containers.

Means is provided for continuously conveying a line of empty containers through the container sterilizing section where they become sterilized, and at such speed with reference to a filler in the filler section as to cause the respective containers to become substantially uniformly filled as they pass by the filler which supplies a continuous stream of the pre-sterilized product into the containers.

From the filler section, the product filled containers are conducted to the cover applying section which contains a conventional closing machine for applying sterile covers to the product filled containers; the covers having been previously sterilized in the cover sterilizing section which communicates with the cover applying section.

Superheated steam may be the gas herein for effecting sterilization of the containers and their covers, but as is disclosed in the aforementioned patent, any other continuous flow of highly heated gas may be employed for sterilizing the containers and their covers, and for preventing inflow of outside air into the apparatus. For example, heated nitrogen or even sterile air may be utilized. The container sterilizing section is heated to a relatively high temperature by the superheated gas; and in the product filling section, a relatively cool pre-sterilized product is introduced into the containers. Such containers are usually coated inside with various types of enamel coatings commonly employed for conventional open mouth metal containers (tin cans) adapted for the canning of food products; and when the relatively cool pre-sterilized product contacts the relatively hot enamel coating on the highly heated containers, this sometimes results in damage to the containers from thermal shock, resulting in so-called blistering of the enamel linings.

To obviate this problem, the improvement herein comprises positively cooling the containers with a sterile cooling fluid which is supplied adjacent the container entrance of the product filling section or zone. In the case of metal containers, water is preferably employed as the cooling fluid, and more particularly water in the form of steam condensate which is sterile. However, any other type of sterile cooling fluid may be utilized to cool positively the containers prior to the time they become filled with the cooled sterile product, such as cooled sterile nitrogen or carbon dioxide, or even cooled sterile air. For accomplishing the cooling efficaciously, an additional section or zone is provided between the container sterilizing section and the filler section into which the cooling fluid is continuously supplied against the containers.

The cooling of the containers not only obviates blistering of enamel linings or coatings, but also aids in minimizing temperature rise of the cooled sterile product being filled into the containers, which might otherwise occur if the cooled pre-sterilized product were filled into relatively hot containers. This temperature rise of the product, although it has no adverse effect insofar as the efficacy of the process is concerned, might cause an undesirable flavor effect.

Furthermore, with respect to certain relatively heat sensitive food products, such as orange juice or milk, surface scorching thereof may occur if they are filled into relatively hot containers. The cooling of the containers before they are filled minimizes such scorching effect. Also, should the containers be provided with so-called lithographed coatings on their outside surfaces, cooling of the containers before they are filled and prior to their passage through the remaining parts of the apparatus, obviates damage to these types of coatings which might otherwise be caused by scraping along guide rails or parts of the equipment, inasmuch as at relatively high temperatures, such coatings become soft and are easily damaged. The cooling of the containers thus hardens or sets these coatings after they have become heated.

From the preceding summary, it is seen that this invention has as its objects, among others, the provision of an improved and economical method and apparatus of the character disclosed in the aforementioned patent, whereby the containers are cooled adjacent the entrance to the product filling section so that they are relatively cool before the cooled presterilized product enters or contacts the same, to minimize damage to such containers, which might otherwise occur from thermal shock, and also minimize temperature rise and scorching of heat sensitive products, and harden or set lithographed coatings that may be provided on the outside of the containers. Other objects and further particulars of the invention will become apparent from the following description in which reference is made to the drawings. In such drawings:

Fig. 1 is a more or less schematic assembly view illustrating the main parts of the apparatus.

Fig. 2 is a schematic outline of the apparatus for depicting the process in flow sheet form.

Fig. 3 is a more or less schematic view, partly broken away and in section to illustrate more clearly the construction, of a form of steam condensing unit for providing cool sterile steam condensate as the cooling fluid.

Fig. 4 is a section of the container cooling section of the apparatus taken in a plane indicated by line 4—4 in Fig. 2.

The apparatus is of the same type disclosed in the aforementioned Patent No. 2,549,216, and more specifically of the form disclosed in applicant's co-pending application, Serial No. 238,060, filed July 23, 1951, now Patent No. 2,685,520, dated August 3, 1954, for "Apparatus and Method for Preserving Products in Sealed Containers." Such apparatus comprises container sterilizing section 2, having an entrance 3 into which empty containers to be sterilized are continuously conducted and through which the containers are conveyed in upright position by any suitable conveying means. Steam distributing piping 4 having steam ejection orifices is provided in the container sterilizing section from which flow of superheated steam is continuously ejected at substantially atmospheric pressure to sterilize the containers as they pass through the container sterilizing section. Under most conditions, a temperature of between 350° F. to 500° F. will effect thorough sterilization of the containers in the container sterilizing section when the time of travel of containers therethrough is about one minute to thirty seconds, respectively; the longer the residence time of the containers in the container sterilizing section, the lower the sterilizing temperature required.

For example, effective sterilization of the containers when the residence time in the container sterilizing section is about thirty seconds can be effected at a temperature of about 500° F. If the temperature is 550° F., the residence time would only be about twenty seconds. For commercial practicability, it is desirable that the residence time be relatively short. Therefore, higher sterilizing temperatures are preferred.

Container sterilizing section 2 communicates with container cooling section 5 in which cooling fluid distributing means 5', described more fully hereinafter, is provided for effecting positive cooling of the containers 5a as they are conveyed through the section to produce the results previously related. Cooling section 5, in turn, communicates with filler section 6. This filler section and the filler 6' therein may be of the type disclosed in Patent No. 2,667,424 dated January 26, 1954, and is, hence, only generally referred to herein. A cooled pre-sterilized product is continuously fed to filler 6' in filler section 6. For effecting pre-sterilization of the product, a so-called "flash sterilization" system which is well known in the art for sterilization of food products, is employed which enables the product to be rapidly sterilized.

The "flash sterilization" system is illustrated schematically in Fig. 1 and includes a heater 7 which is maintained at such high temperature as to sterilize the product rapidly. Heater 7 is connected by piping to a so-called holder 8 where the temperature is maintained for sufficient length of time to complete the sterilization; and holder 8 is connected by piping to a cooler 9 wherein the sterilized product is chilled or cooled. The cooled sterile product is conducted from cooler 9 to the filler 6' in the filler section by piping 11. Usually, the product becomes cooled to a temperature of about 80° F. for filling thereof in the containers.

Superheated steam distributing piping 12 is also provided in filler section 6; and a valve 13 is provided to control flow of superheated steam into piping 12. During normal operation of the embodiment of the invention hereof, flow of steam into piping 12 is shut off by valve 13, as the superheated steam is introduced directly into the filler section only when operation of the apparatus is initiated to sterilize the interior of the filler section and all the appurtenances therein. After such initial sterilization is effected, the direct flow of the superheated steam from piping 12 is shut off but sterile conditions are maintained in the filler section, which may be accomplished by continuous introduction into the filler section of a sterile gas through piping 13' in the manner disclosed and claimed in the aforementioned co-pending application, Serial No. 238,060 (Patent No. 2,685,520).

From filler section 6, the containers filled with a sterile product are conducted into a housing 14 containing suitable mechanism for transfering the containers to cover applying section 15 having a conventional closing machine 16 for applying sterilized covers 16' to the product filled containers. The covers are sterilized by superheated steam in a cover sterilizing section 17 which is in communication with cover applying section 15 to which the sterilized covers are conducted by suitable means. A cover inlet opening 18 is provided in cover sterilizing section 17; and the covered product filled containers are discharged from cover applying section 15 through exit 19. The cover sterilizing section is preferably of the type disclosed in applicant's co-pending application, Serial No. 178,116, filed August 7, 1950, now Patent No. 2,771,664, dated November 27, 1956, for "Apparatus and Method for Sterilizing Container Covers."

The temperature of the superheated steam introduced into the cover sterilizing section 17 and the length of time for sterilizing the covers are of substantially the same order as that for sterilization of the containers. Superheated steam distributing piping 20 is provided in cover sterilizing section 17; such piping being connected to piping 21 in the container sterilizng secton 2 in which the steam is superheated. Also connected to piping 21 is steam distributing piping 22 which extends into transfer housing 14; a valve 23 being provided in piping 22 for allowing superheated steam to be introduced into the transfer housing to sterilize the interior when the operation of the apparatus is initiated. As with respect to valve 13, valve 23 may be shut off after the entire apparatus has been sterilized, and is operating.

As is disclosed in the aforementioned application, Serial No. 238060 (Patent No. 2,685,520), combustion gases may be provided for superheating the steam. For this purpose, a gas burner 24 is associated directly with the container sterilizing section 2 to superheat the steam. The container sterilizing section may be of any suitable type, such as is disclosed in applicant's co-pending application, Serial No. 199,020, filed December 4, 1950, now Patent No. 2,771,645, dated November 27, 1956, for "Apparatus and Method for Sterilizing Containers," in which gas burner 24 is located; a thermostat control 26 being connected in any usual manner to the control valve of gas burner 24 for automatically controlling the sterilizing temperature in the container sterilizing section. In this connection, combustion gases or any other suitable sterile gas may be continuously introduced into the cover applying section 15, through piping 27 connected therewith for the purpose explained in the aforementioned co-pending application, Serial No. 238,060 (Patent No. 2,685,520).

As previously related, the containers 5a are cooled in cooling section 5 which is positioned between exit 31 of container sterilizer section 2 and entrance 32 of filler section 6, so that the containers are positively cooled adjacent entrance 32 and prior to the time they pass the pre-sterilized cooled product continuously flowing from filler 6' in section 6. In the csae of conventional metal containers, relatively cool sterile water is employed as the cooling fluid.

As is illustrated in Fig. 4, containers 5a are conducted through the apparatus by suitable conveying means as in the aforementioned patents and applications, which may be a continuously driven endless cable 33 supported on suitable pulleys 34, upon the upper reach of which the bottoms of the containers rest; the containers being guided between suitable side guide bars 36. The cooling fluid distributing means 5' comprises U-shaped piping 37 having side spray nozzles 38 of any suitable construction to provide a passageway through which the containers are conveyed with their mouths uppermost and thus direct sprays of water against the outer sides of the containers, and bottom nozzles 39 which direct sprays of water against the bottoms of the containers. It will be noted that the sprays of water are so arranged that none of the water is directed inside the containers, as the water only hits the outside thereof. The bottom 41 of cooling section 5 is sloped, and is provided with a suitable drain opening 42 for the cooling fluid. The flow of the scavenging gas through the apparatus prevents inflow of outside air through the drain opening 42.

U-shaped piping 37 is connected to sterile water inlet piping 43 through which a continual flow of the sterile water is supplied by any suitable pumping means. Any suitable source of sterile water may be employed. Fig. 3 illustrates a form of such source of supply for the sterile water. Steam from any suitable source, such as a boiler is supplied through piping 44 into a condenser coil 46 positioned in cooling tank 47; a valve 48 being provided in piping 44 to control the amount of steam supplied to the condenser coil. Tank 47 is provided with a cooling water inlet pipe 49 at the bottom and with a cooling water outlet pipe 51 at the top. Thus, as the cooling water flows through cooling tank 47, the steam in condenser coil 46 condenses to form steam condensate which is sterile. A suitable drain valve 52 is provided at the bottom of tank 47 to drain the contents when desired.

Condensate from coil 46 flows through piping 53 into a condensate collecting tank 54; and a level 56 of condensate is maintained in the tank by means of overflow pipe 57. The lower end of pipe 57 is provided with an upwardly extending goose neck extension 58 to provide a trap in which water is continually maintained, so as to prevent entrance of outside air into the system at this point.

Trap 58 is provided with a valve 59 which, when the apparatus is pre-sterilized in preparation for use thereof, is initially opened for a minute or two while hot steam is run through the condenser system to sterilize all the parts, and is then closed until the condenser system is operating and the trap is full of sterile steam condensate, whereupon valve 59 is opened. The continual head of steam condensate in the trap then prevents entrance of outside bacteria laden air into the system at this point.

The bottom of tank 54 is connected to the sterile water inlet piping 43 through which the steam condensate is continuously pumped by pump 61. At its top, tank 54 is provided with a small vent opening 62 positioned under a hood 63 which is connected by piping 64 to a continual source of vacuum (not shown) which may be relatively slight. This source of vacuum creates a continual suction over vent opening 62 preventing flow of outside air into the condensate collecting tank through the vent.

Sufficient water is supplied to the outside of the containers as they pass through the container cooling section 5 to produce a film of water over the entire exterior surfaces of the containers. This effects a great reduction in the temperature of the containers in a relatively short time. For example, with metal containers varying in size from Nos. 202 through 404 and having a temperature of about 430° F. to 440° F. as they leave exit 31 of the container sterilizer section 2, water cooled to a temperature of about 150° F. and sprayed over the outer surfaces of the containers at a rate of about 24 gallons per hour, will effect cooling of the containers down to a temperature of about 220° F. to 250° F. with a residence time of about one second through cooling section 5. In this connection, the amount of cooling fluid supplied is not critical, and any excess of the fluid will do no harm. It is only desirable to supply sufficient of the cooling fluid to reduce the temperature of the containers below the temperature at which thermal shock may damage the coatings on the inside of the containers as they are filled with the relatively cool pre-sterilized product.

I claim:

1. Canning apparatus comprising intercommunicating enclosure means containing a container sterilizing section having an entrance for containers to be filled, a product filling section having means therein for filling the containers with a pre-sterilized cooled product, a cover sterilizing section, and a section having means therein for applying container covers to the product filled containers and having an exit for covered containers; said entrance and exit being open to the atmosphere whereby gas introduced into the apparatus will be at substantially atmospheric pressure; means for continuously conveying containers in said apparatus, means for introducing gas into said apparatus heated to a sterilizing temperature at atmospheric pressure substantially in excess of 212° F., an enclosed container cooling section between and in communication with the container sterilizing section and the product filling section, and water spray means in said cooling section arranged to direct water against the outside surfaces of said containers.

2. In the continuous method of canning wherein a series of metal containers having inside enamel linings is continuously moved through an enclosed sterile system including a container sterilizing zone in which the containers are heated to sterilize the same, a zone in which a pre-sterilized cooled product is filled into said containers while they are continuously moved through such filling zone, a cover sterilizing zone, and a zone in which the covers are applied to the filled containers, all of said zones being in intercommunication; the step of minimizing damage to said heated containers from thermal shock which might otherwise result from the cooled product contacting the same which comprises cooling the containers while they are continuously moved through said enclosed system and by subjecting said heated containers to a sterile aqueous cooling medium in another zone located between said heated container sterilizing zone and said product filling zone.

3. Canning apparatus comprising intercommunicating enclosure means containing a container sterilizing section having an entrance for containers to be filled, a product filling section having means therein for filling the containers with a pre-sterilized cooled product, a cover sterilizing section, and a section having means therein for applying container covers to the product filled containers and having an exit for covered containers; said entrance and exit being open to the atmosphere whereby gas introduced into the apparatus will be at substantially atmospheric pressure; means for continuously conveying containers in said apparatus in upright position with their mouths uppermost, means for introducing gas into said apparatus heated to a sterilizing temperature at atmospheric pressure substantially in excess of 212° F.; an enclosed container cooling section between and in communication with the container sterilizing section and the product filling section, water spray means in said cooling section arranged in U-shaped form and providing a passageway through which said containers are conveyed with their mouths uppermost whereby water is directed substantially only against the outer surfaces of the containers, and means connected to said spray means to supply sterile cooling water thereto.

4. Canning apparatus comprising intercommunicating enclosure means containing a container sterilizing section having an entrance for containers to be filled, a product filling section having means therein for filling the containers with a pre-sterilized cooled product, a cover sterilizing section, and a section having means therein for applying container covers to the product filled containers and having an exit for covered containers; said entrance and exit being open to the atmosphere whereby gas introduced into the apparatus will be at substantially atmospheric pressure; means for continuously conveying containers in said apparatus in upright position with their mouths uppermost, means for introducing gas into said apparatus heated to a sterilizing temperature at atmospheric pressure substantially in excess of 212° F., an enclosed container cooling section between and in communication with the container sterilizing section and the product filling section, piping in said cooling section arranged U-shaped to provide a passageway through which said containers are conveyed with their mouths uppermost, said piping having water outlets in its upright and bottom portions to direct the water substantially only against the outer sides and the bottoms of the containers, a source of sterile condensed steam, and means connected between said condensed steam source and said piping for supplying said water to said piping in the form of sterile steam condensate.

5. In the continuous method of canning wherein a series of metal containers having inside enamel linings is continuously moved in upright position with their mouths uppermost through an enclosed sterile system including a container sterilizing zone in which the containers are heated to sterilize the same, a zone in which a pre-sterilized cooled product is filled into said containers while they are continuously moved through such filling zone, a cover sterilizing zone, and a zone in which the covers are applied to the filled containers, all of said enamel linings of said zones being in intercommunication; minimizing blistering of the enamel linings of said containers which might otherwise result from the cooled product contacting the same while simultaneously maintaining the containers sterile which comprises continuously cooling said containers in a cooling zone located between said heated container sterilizing zone and said product filling zone by directing sterile water substantially only against the outer surfaces of the containers as they are continuously moved through said cooling zone.

6. In the continuous method of canning wherein a series of metal containers having inside enamel linings is continuously moved in upright position with their mouths uppermost through an enclosed sterile system including a container sterilizing zone in which the containers are heated to sterilize the same, a zone in which a pre-sterilized cooled product is filled into said containers while they are continuously moved through such filling zone, a cover sterilizing zone, and a zone in which the covers are applied to the filled containers, all of said zones being in intercommunication; minimizing blistering of the enamel linings of said containers which might otherwise result from the cooled product contacting the same while simultaneously maintaining the containers sterile which comprises maintaining a source of sterile steam condensate, and continuously cooling said containers in a cooling zone located between said heated container sterilizing zone and said product filling zone by directing said sterile steam condensate substantially only against the outer sides and the bottoms of the containers as they are continuously moved through said cooling zone.

References Cited in the file of this patent

UNITED STATES PATENTS

| 2,424,049 | Parker et al. | July 15, 1947 |
| 2,549,216 | Martin | Apr. 17, 1951 |
| 2,639,991 | Ball | May 26, 1953 |
| 2,685,520 | Martin | Aug. 3, 1954 |

OTHER REFERENCES

Farmers Bulletin, 1211 U. S. Dept. of Agriculture, pp. 18, 24, 25.

UNITED STATES PATENT OFFICE
CERTIFICATE OF CORRECTION

Patent No. 2,855,314                       October 7, 1958

William McK. Martin

It is hereby certified that error appears in the printed specification of the above numbered patent requiring correction and that the said Letters Patent should read as corrected below.

Column 4, line 18, for the patent number "2,771,664" read -- 2,771,644 --; line 33, after "respect" strike out "to"; column 6, line 31, before "said" insert -- said enamel linings of --; column 7, line 24, strike out "said enamel linings of".

Signed and sealed this 10th day of February 1959.

(SEAL)
Attest:

KARL H. AXLINE
Attesting Officer

ROBERT C. WATSON
Commissioner of Patents